United States Patent Office 3,721,606
Patented Mar. 20, 1973

3,721,606
GLUTAMINASE GA
Tamotsu Yokotsuka, Nagareyama, and Takashi Iwaasa and Mitsuharu Fujii, Noaa, Japan, assignors to Kikkoman Shoyu Co., Ltd., Noda-shi, Japan
Filed Oct. 13, 1970, Ser. No. 80,279
Claims priority, application Japan, June 13, 1970, 45/50,712
Int. Cl. C12d 13/10
U.S. Cl. 195—62
5 Claims

ABSTRACT OF THE DISCLOSURE

Glutaminase GA having the nearly equal activities as a glutaminase and asparaginase, which is useful in the fields of food and pharmaceutical industries, is obtained from *Pseudomonas fluorescens* ATCC 21541.

---

Figure 1:
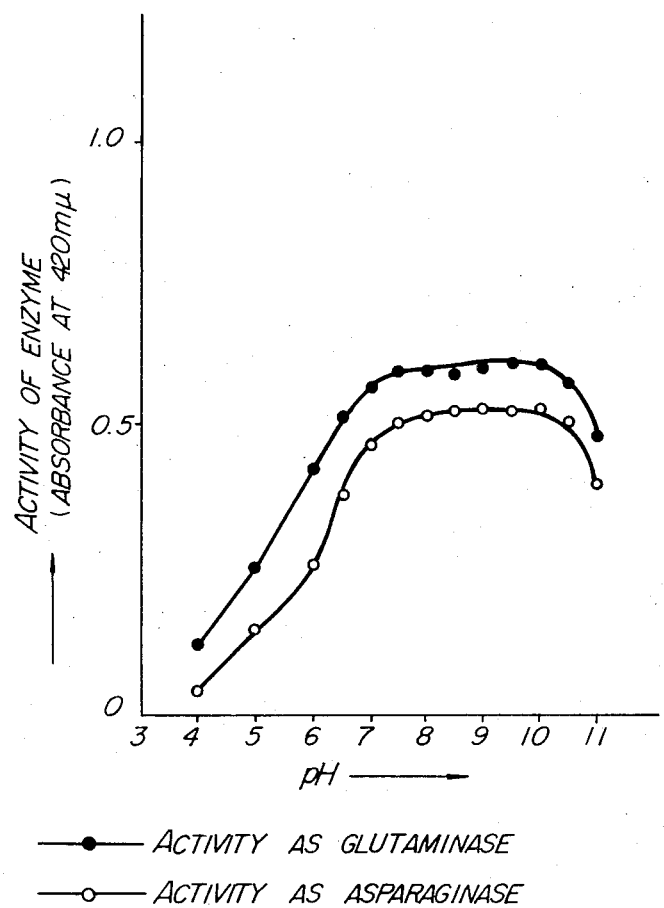

The present invention relates to a novel enzyme glutaminase GA having the glutaminase activity and, in addition, the asparaginase activity almost equal to the level of the former enzyme and a process for preparing the same.

It has been known that glutaminase plays an important role in the food industry, particularly in the production of seasonings by the enzymatic decomposition of the protein materials.

Furthermore, glutaminase has attracted attention in the field of biochemistry and medicine.

On the other hand, asparaginase has attracted attention markedly in the field of medicine and biochemistry due to the unique action of the enzyme on certain tumors and it is highly appreciated as a medicament.

It has been known that both glutaminase and asparaginase are distributed extensively in the animal tissues, plant tissues and mircoorganisms. Extensive investigation has been made on the enzymo-chemically highly purified preparations of the enzymes.

Microorganisms have recently been examined extensively as enzyme sources for an industrial production of these enzymes. For example, asparaginase has been confirmed to be present in many strains belonging to the genera such as Aerobacter, Aeromonas, Alcaligenes, Bacillus, Erwinia, Escherichia, Proteus, Pseudomonas, Serratia, Aspergillus, Penicillium and the like [for example, refer to R. E. Peterson & A. Ciegler "Applied Microbiology," 17, p. 929, (1969)]. Glutaminase has also been confirmed to be present in the microorganisms belonging to Escherichia, Proteus, Clostridium, Streptococcus, Staphylococcus and the like and yeast (for example, refer to "Handbook of Enzymes," p. 532, edited by S. Akabori and published from Asakura Shoten).

Asparaginase or glutaminase has heretofore been isolated from many microorganisms, purified and reported to have an activity of the other enzyme, mutually. However, either asparaginase or glutaminase has usually high activity of its own and low activity of the other enzyme.

An object of this invention is to provide glutaminase GA.

A further object of this invention is to provide a medicament containing said glutaminase GA.

A still further object of this invention is to provide a process for producing said glutaminase GA.

These and other objects will become apparent from the following description of the specification and the appended claims.

During an investigation on glutaminase and asparaginase produced by microorganisms, the present inventors have found that the 30–21 strain identified to belong to *Pseudomonas fluorescens* isolated from the soil has the glutaminase activity and, in addition, the asparaginase activity nearly equal to the level of the glutaminase activity. When the enzymes produced from the strain were further purified, the behavior of both enzyme activities was entirely identical in each step of the purification. It was confirmed that the enzyme protein which was finally found homogeneous by a disc electrophoresis had the glutaminase activity and, in addition, the asparaginase activity almost equal to the level of the former enzyme activity.

Still further, the optimum pH range of both enzyme activities of the purified enzyme protein was entirely the same, therebeing no difference in the behaviours against various inhibitors, anions and the like. These facts suggest that both enzyme actions are contained in a single enzyme protein. Thus, the present inventors names the enzyme having the glutaminase activity and, in addition, the asparaginase activity almost equal to the level of the former enzyme activity as glutaminase GA.

The bacteriological properties of the 30–21 strain producing glutaminase GA are as follows:

(1) Cultural characteristics

Nutrient agar culture medium:
abundant growth, circular form of the colonies, smooth surface, entire circumference, flat or semi-convex protrusion, amorphous and translucent colonies, yellowish gray tone, glistening luster, no secretion of the pigments on the culture medium.

Nurtient agar slant:
favorable growth, spreading form of the colonies. Other characteristics are the same as those described on the nutrient agar.

Nutrient broth:
favorable growth, membraneous surface, strongly turbidic, viscid sedimentation, no evolution of gas and no pigmentation of the medium.

Stab culture (agar):
filiform colonies, growth is best at top.

Glucose-ammonium culture medium:
It grows on the medium to produce an acid.

p-Hydroxybenzoate culture medium:
favorable growth, production of the greenish pigment and fluorescence.

Glucose-nitrate culture medium:
growth

Succinate-nitrate culture medium:
growth

Glutamate-nitrate culture medium:
growth

Glutamate culture medium:
growth, production of the greenish pigment and the fluorescence Gluconate culture medium:
growth, production of the greenish pigment and the fluorescence Ethanol culture medium:
growth, no production of an acid (2) Morphological properties Size and form:
Short rods having the size of 0.7×1.7—2µ, single and rounded end
flagellum (motility): motile, polar fragellum
spore formation: not observed

(3) Physiological properties growth temperature: growth at a temperature range from 10 to 37° C., optimum growth at a temperature from 25 to 37° C., no growth at 39.5° C.
gram-staining: negative
nitrate reduction: positive
Litmus milk (coagulation of the milk): not coagulated, alkaline
gelatin stab: Liquefaction in stratiform
decomposition of starch: not hydrolysed
indole formation: not produced
hydrogen sulfide formation: not produced
Voges-Proskauer test: negative
methyl red test: negative
ammonia formation from peptone: produced from peptone
catalase formation: positive
relation to sodium chloride: no growth at 7.0% of sodium chloride
utilization of carbon sources: glycerin, xylose, glucose, fructose, galactose, mannose, mannitol and dextrin can be assimilated. aerobic formation of acid from glucose in the Hugh-Leifson's test. no production of gas, no production of an acid, or gas from lactose, and sucrose.

After an examination of the bacteriological properties of said 30–21 strain by reference to Microbiological Method (1957) and criteria for classification according to Bergey's Mannual of Determinative Bacteriology, 7th ed. (1957), the 30–21 strain was identified to belong to *Pseudomonas fluorescens* and it was named as *Pseudomonas fluorescens* 30–21. This strain seems to be a novel strain which has heretofore not been known entirely in producing a novel enzyme having the glutaminase activity and, in addition, the asparaginase activity nearly equal to the level of the former enzyme activity. This strain has been deposited as ATCC 21541 in the American Type Culture Collection (ATCC) in the United States.

The present invention has been achieved based upon the above finding and provides a process for the preparation of glutaminase GA which comprises cultivating *Pseudomonas fluorescens* 30–21 on a culture medium to produce glutaminase GA and recovering glutaminase GA from the culture medium.

As medium in accordance with the present invention, normally liquid media are preferred. As nutrients to be added to the medium, there may be employed various nutrient sources to be employed for cultivation of microorganisms. That is to say, glucose, glycerin, maltose and the like are employed as a carbon source and as a nitrogen source, for example, there are employed peptone, meat extract, yeast extract, corn-steep liquor, casamino acid, defatted soybean, or hydrolysate of wheat gluten, ammonium salts, nitrates and the like. Besides these, salts such as magnesium, calcium, potassium, sodium and a trace amount of nutritional materials may be added, if necessary.

The cultivation temperature varies from 25 to 37° C., around 35° C. being preferred. The initial pH is preferably between 6.5 and 7.0. Any aerobic cultivation methods may be employed, however, cultivation under aeration, in particular, submerged cultivation with aeration is preferred and for an industrial purpose, it is suitable to employ a fermentor equipped with an aerator and an agitator. Cultivation is normally completed in 10 to 16 hours.

For collecting glutaminase GA from the culture broth after termination of the cultivation, though a collecting means for glutaminase GA may be applied to the culture medium directly, it is preferable that the cells are first harvested by suitable methods, for example, centrifugation, or filtration and the like and then a collecting means for glutaminase GA is applied to the cells since glutaminase GA is mostly maintained in the cells.

For the recovery of glutaminase GA, general enzyme extraction methods may be employed. For example, the cells are first destroyed by mechanical grinding, sonic oscillation, or ultrasonic oscillation, high-pressure homogenizer, French pressure cell and the like or they are lysed by lytic enzymes such as lysozyme and the like or glutaminase GA is extracted from the cells by means of a treatment with ethylene diamine tetraacetic acid or osmotic shock to obtain a crude solution of glutaminase GA, which is then fractionated by addition of ammonium sulfate, alcohol and the like and the precipitate is collected. They are dialysed against deionized water and lyophilized to yield a crude glutaminase GA.

Thus obtained crude product of glutaminase GA is subjected to adsorption and elution employing various ion exchangers, for example, TEAE-cellulose (triethylaminoethyl cellulose; a product of Brown Co. U.S.A.), QAE-sephadex (diethyl-2-hydroxypropyl ammonium ethylsephadex; a product of Pharmacia, Sweden), to gel-filtration employing Sephadex G–150 (a product of Pharmacia, Sweden), and Bio-Gel P–150 (a product of Bio-Rad Co., U.S.A.), to an adsorption and elution employing hydroxylapatite (Bio-Gel HT manufactured by Bio-Rad Co., U.S.A.), and to an electrophoresis using polyacrylamide gel in a suitable combination to yield a highly purified enzyme product.

As an example of the purification, a crude product of glutaminase GA obtained by fractionation with ammonium sulfate or alcohol is made into an aqueous solution and the solution is first subjected to chromatography using TEAE-cellulose or QAE-Sephadex. When TEAE-cellulose is employed, for example, said crude enzyme solution is applied to a column of TEAE-cellulose equilibrated with a 1/100 M phosphate buffer solution (pH 7.0 to 8.0) containing sodium chloride to adsorb glutaminase GA and then it is eluted with a linear gradient of sodium chloride between 0.02 M and 0.1 M in the said buffer. Effective fractions of glutaminase GA are collected and thus partially purified enzyme is obtained.

Subsequently a gel-filtration is carried out using Sephadex G–150 or Bio-Gel P–150 and the like. That is to say, said partially purified solution is applied to a column of Bio-Gel P–150 equilibrated with a 1/100 M phosphate buffer solution (pH 7.0 to 8.0) and elution is carried out with the same buffer solution. The effective fractions of glutaminase GA are collected to yield a partially purified enzyme.

A chromatography is then effected on a column of hydroxylapatite (Bio-Gel HT). That is to say, said partially purified enzyme solution obtained in the above gel-filtration is applied to a column of hydroxylapatite (Bio-Gel HT) equilibrated with a 1/50 M phosphate buffer solution (pH 6.5) to adsorb glutaminase GA and it is eluted with a linear concentration gradient of the same buffer solution. The effective fractions of glutaminase GA are collected to obtain a purified enzyme.

An example of the result of the aforementioned extraction, isolation and purification of glutaminase GA is shown in summary as follows.

| Step | Volume (ml.) | Specific activity, unit/mg. protein[1] | Asparaginase activity/ glutaminase activity | Yield (percent) |
|---|---|---|---|---|
| Crude enzyme solution | 1,000 | 5.52 | 0.91 | 100 |
| Ammonium sulfate fraction, 40–60% saturation | 100 | 124 | 0.92 | 81.2 |
| TEAE-cellulose column chromatography (highly active fraction) | 100 | 43.2 | 0.92 | 54.6 |
| Bio-Gel P–150 column gel filtration (highly active fraction) | 50 | 91 | 0.92 | 40.1 |
| Hydroxylapatite column chromatography (highly active fraction) | 50 | 102 | 0.92 | 36.4 |

[1] It was shown with regards to the glutaminase activity.

The enzyme fraction in the aforesaid final purification step was dialysed against deionized water and then lyophilized to yield a white powder. Purified glutaminase GA was electrophoretically homogeneous on disc electrophoresis at pH 9.5.

Figure 5:
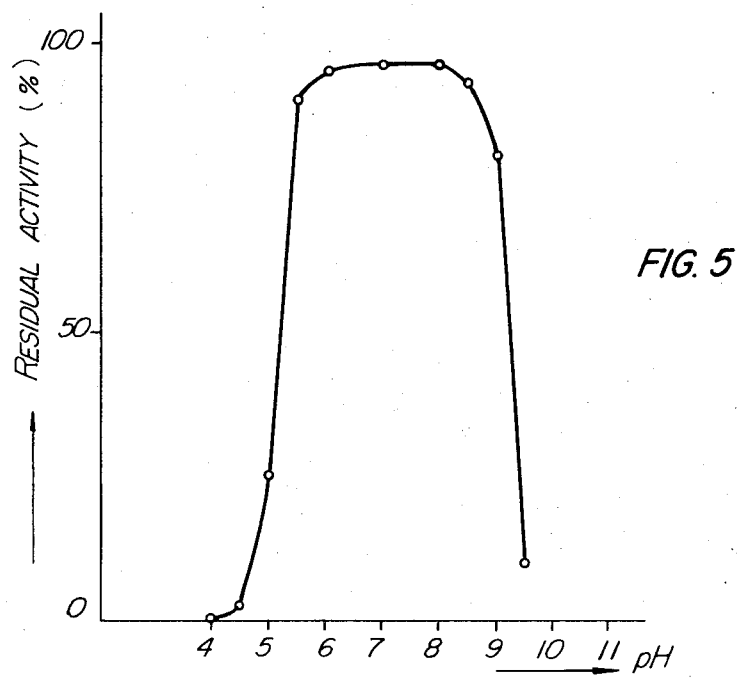

An optimum pH of glutaminase GA prepared in accordance with the process of the present invention is in the range of about 7 to 9 (refer to FIG. 1), and the stable pH range is between 6 and 8. (Refer to FIG. 5. FIG. 5 shows the result of determination of the remaining activity after an enzyme solution of glutaminase GA adjusted to different pH values was maintained at 45° C. for 10 minutes.)

and most of them have been known to have an activity of the other enzyme mutually, but usually many of them have a higher level of the activity of only one enzyme and a slight level of the activity of the other enzyme. Very few enzymes have the glutaminase activity and, in addition, the asparaginase activity almost equal to the level of the former enzyme activity like glutaminase GA.

As an enzyme similar to glutaminase GA, there is considered an enzyme produced by Pseudomonas GG13 M.E.A. Ramadan et al.: Archives of Biochemistry & Biophysics, 108, p. 143 to 157 (1964) (referred to as GG13 enzyme hereinafter), however, glutaminase GA is clearly different from GG13 enzyme in the following respects.

|  | Glutaminase GA | GG13 enzyme |
| --- | --- | --- |
| Optimum pH | Both the glutaminase activity and the asparaginase activity have an optimum pH at pH 7.0 to 9.0. | While the glutaminase activity has an optimum pH at pH 6.6, the asparaginase activity has it at pH 8.2. |
| Molecular weight | 96,000 to 105,000 | 25,000. |
| Influence of anions | Both the glutaminase activity and the asparaginase activity show the same behaviour and they are neither promoted nor inhibited by phosphate, borate, sulfate, arsenate, cyanate, nitrate ions and the like. However, they are strongly inhibited by iodine and pyruvic acid. | The glutaminase activity is promoted by phosphate, borate, sulfate, arsenate ions and the like. The asparaginase activity is, on the contrary, inhibited by phosphate, borate, arsenate ions and the like. The asparaginase activity is promoted by cyanate, nitrate ions and the like. Both activities are not inhibited by iodine. |
| Influence of inhibitors | Both enzyme activities show the same behaviour and they are not inhibited by phthalein dyes or decomposed products, glutamic acid and aspartic acid. | The glutaminase activity is strongly inhibited by phthalein dyes, but asparaginase is strongly inhibited by only bromocresol. The glutaminase activity is inhibited by glutamic acid. |
| Influence of metal ions | Both enzyme activities are neither promoted nor inhibited. | Both enzyme activities are strongly inhibited by $Fe^{+++}$ and $Hg^{++}$. |

Figure 6:
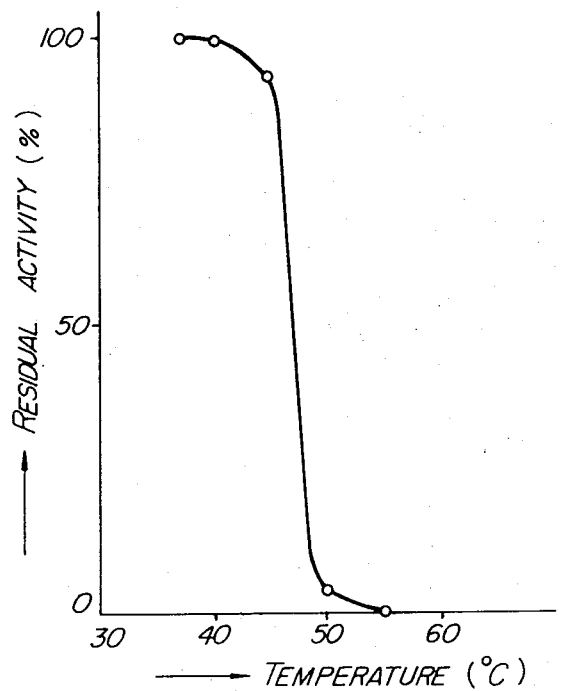

As for the thermal stability, 95% of the activity is lost by the treatment at 50° C. for 10 minutes and the activity is completely lost by the treatment at 55° C. for 10 minutes. (Refer to FIG. 6. FIG. 6 shows the result of determination of the remaining activity after glutaminase GA dissolved in 0.05 M tris-buffer (pH 7.5) was maintained at respective temperatures for 10 minutes.) The molecular weight is found to be in the range of about 96,000 to 105,000 according to a method using Sephadex G-150 (a gel-filtration method).

As for the effect of anions on glutaminase GA, there is observed almost no promotion or inhibition of the activity by anions such as phosphate, borate, sulfate, arsenate, cyanate, nitrate, however, it is strongly inhibited by iodine and pyruvic acid. It is not inhibited by phthalein dyes, decomposed products such as glutamic acid, aspartic acid and the like. The present enzyme is neither promoted nor inhibited by metal ions.

The substrate-specificity of glutaminase GA is as follows:

| Substrate | [1] Relative activity |
| --- | --- |
| L-Glutamine | 100 |
| L-Asparagine | 92 |
| D-Glutamine | 75 |
| D-Asparagine | 30 |
| DL-Phenylalanineamide | 0 |
| L-Leucineamide | 0 |
| Glycineamide | 0 |
| Nicotinamide | 0 |
| Adenine | 0 |
| Acetamide | 0 |
| Propionamide | 0 |
| n-Valeramide | 0 |
| Oxamide | 0 |
| Succinamide | 0 |
| Benzamide | 0 |

[1] The activity on L-glutamine was calculated as 100.

Asparaginase or glutaminase has heretofore been isolated and purified from a large number of microorganisms It may be said from the foregoing that glutaminase GA prepared in accordance with the process of the present invention is a novel enzyme whose properties have been disclosed by the present inventors.

The determination method of the enzyme activity, enzyme unit and the specific activity are demonstrated as follows.

Enzyme activity: 0.2 ml. of an enzyme solution (or cell suspension) is added to a mixture of 0.2 ml. of the substrate (a 0.4% aqueous solution of glutamine or asparagine) and 0.5 ml. of a 0.05 M phosphate buffer solution (pH 7.0) and an enzymatic reaction is carried out at 37° C. for 10 minutes and ammonia formed is measured according to a conventional method. That is to say, a Nesler reagent is added to the reaction solution to develop a color and the absorbance at 420 mμ is measured.

Enzyme unit: An amount of the enzyme which forms 1μ mole of ammonia per minute under said reaction condition is equal to one unit. (1 I.U.) The specific activity is expressed as units per mg. of the protein.

Figure 2:
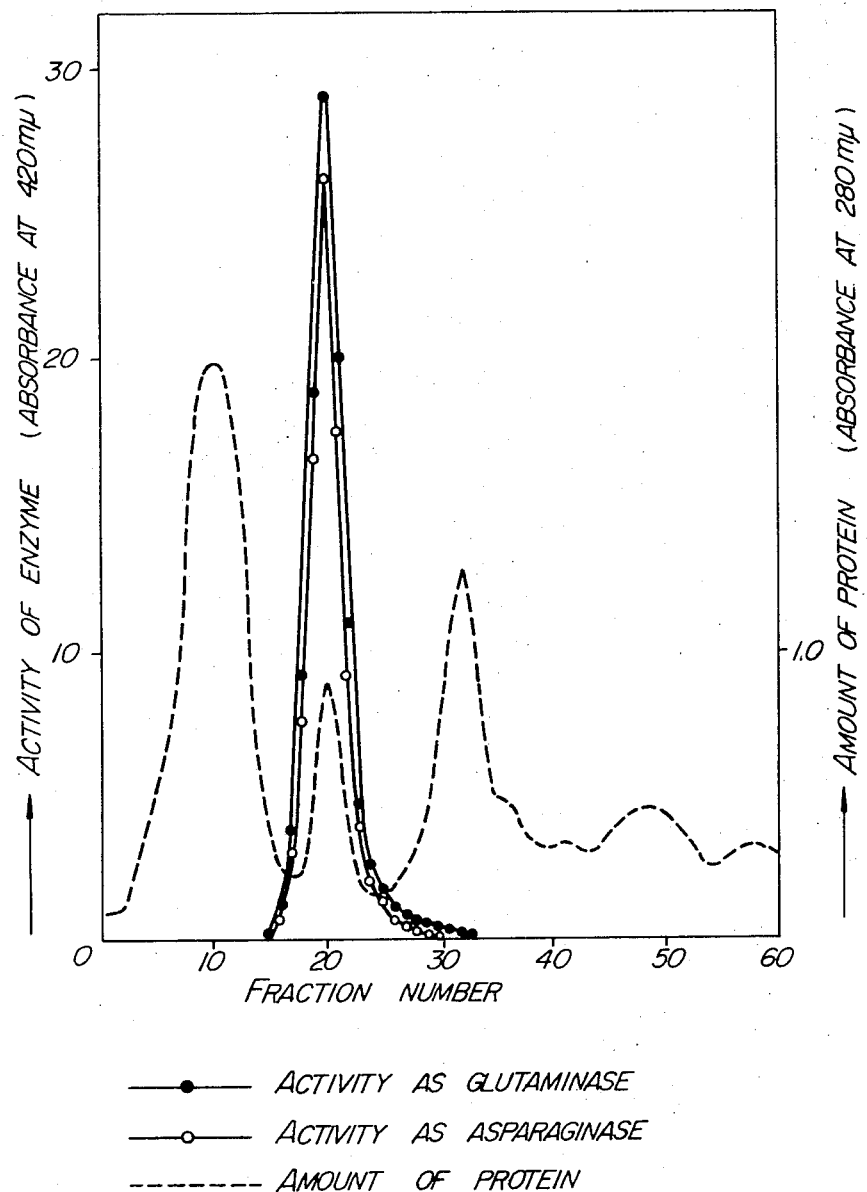
Figure 3:
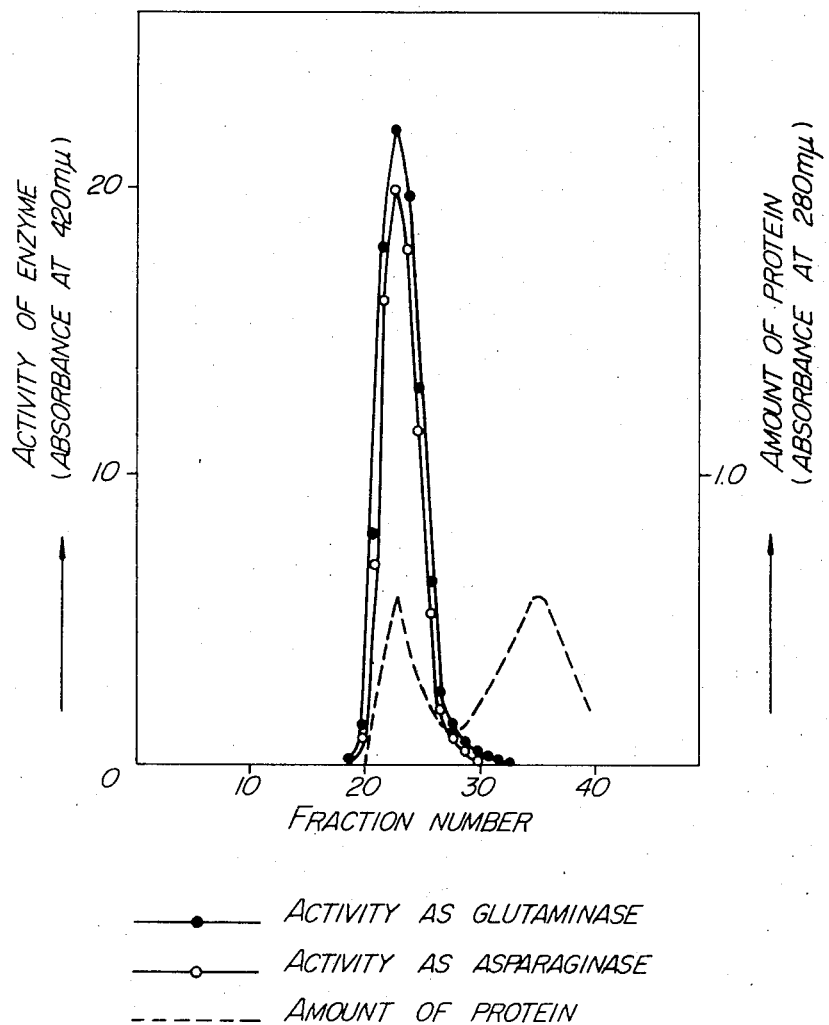
Figure 4:
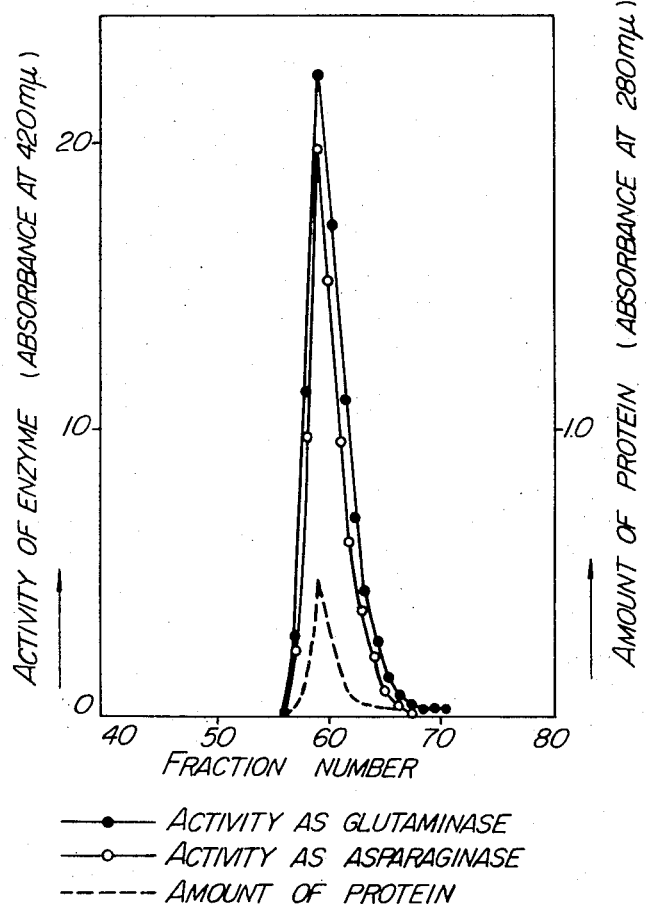

FIG. 1 shows the influence of pH on the activity of glutaminase GA. FIG. 2 shows the results of a chromatogram of glutaminase GA by means of a TEAE-cellulose column. FIG. 3 shows the results of gel-filtration by means of a Bio-Gel P-150 column. FIG. 4 shows the results of chromatogram of glutaminase GA by means of a hydroxylapatite column. FIG. 5 shows the influence of pH on the stability of glutaminase GA. FIG. 6 shows the influence of temperature on the stability of glutaminase GA.

The present enzyme was tested on the following tumors and the following results were obtained.

2 million cells of the 6C3HED/OG and 6C3HED/RG tumors and one million cells of Ehrlich ascites tumor were, respectively, transplanted into the peritoneal cavity of the C3H/He female mice, and one million L1210, and L5178Y/CA55 leulemic cells were transplanted into the peritoneal cavity of the BDF/mice. 24 hours later the present enzyme was given intraperitoneally and the antitumor effect was examined from the survival rate and the retention of the ascites.

ACTION OF GLUTAMINASE GA ON CERTAIN TUMORS

| Tumors | Effects and dosage |
|---|---|
| 6C3HED/OG | A single administration of 250 I.U./kg., and 500 I.U./kg. was effective, respectively. The survival rate was 55% and 64%, respectively. |
| 6C3HED/RG | Twice administrations of 500 I.U./kg. were ineffective. |
| L1210/V | Five times administrations by every other day of 125 I.U./kg. and 50 I.U./kg., respectively, were ineffective. However, administration of 125 I.U./kg. inhibited the retention of the ascites. |
| L5178Y/CA55 | Administrations of both 125 I.U./kg. and 50 I.U./kg. were slightly effective. |
| Ehrlich (Clone 4) | A single administration of each of 500 I.U./kg. and 250 I.U./kg. inhibited strongly the retention of the ascites. |

The present invention is illustrated by way of practical examples.

EXAMPLE 1

*Pseudomonas fluorescens* 30-21 which had previously been cultivated at 30° C. for 18 hours with shaking in 5 ml. of the medium containing 0.5% by weight of glucose, 0.72% by weight of disodium phosphate, 5.0% by weight of HCl-decomposed solution of defatted soybean (total nitrogen contents being 2.1%) and adjusted to pH 6.5 was inoculated to 100 ml. of the same medium and cultivation was effected with shaking at 30° C. for 16 hours using a recipro type shaker of 140 r.p.m. The glutaminase GA activity per one ml. of the medium was 1.9 I.U. and the cell amount was 5 g./l. when calculated as dry weight.

When the cultivated solution was centrifuged and the cells were collected, 95% of the total activity observed in the cultivated broth was recovered together with the cells. Thus obtained cells were suspended in a phosphate buffer solution (0.01 M, pH 7.5), which was subjected to the ultrasonic treatment at 20 kc. for 3 minutes and then subjected to centrifugation (10,000 G., for 10 minutes) to yield about 30 ml. of a supernatant as a crude extract of glutaminase GA.

92% of the activity held by the cells was recovered in this crude enzyme extract and the specific activity was 0.5. The crude enzyme was fractionated with ammonium sulfate and precipitates formed by 40 to 90% saturation was ammonium sulfate were collected. 80% of the total activity contained in the crude enzyme extract was recovered in this precipitate and the specific activity was increased to 8.0. The precipitates were dissolved in deionized water, dialysed against the same deionized water and lyophilized to obtain a grayish white powder as a crude enzyme product of glutaminase GA.

EXAMPLE 2

15 l. of the medium containing 0.75% by weight of glucose, 8.0% by weight of the HCl-decomposed product of gluten (total nitrogen contents being 2.3% by weight), 0.72% by weight of disodium phosphate, and 0.64% by weight of mono potassium phosphate and which was adjusted to pH 6.5 after sterilization was charged to a jar-fermenter of the capacity of 30 l. and 200 ml. of the cultivated solution of *Pseudomonas fluorescens* 30-21 cultivated in the same manner as in Example 1 were inoculated thereon and the cultivation was carried out under agitation at 33° C. for 11 hours at the rate of 15 l./minute of aeration and at 250 r.p.m. of agitation. The activity of glutaminase GA of thus obtained cultivated broth was 2.5 I.U./ml. and the cell amount was 7.0 g./l. as a dry weight.

The cells collected by centrifugation from the cultivated solution were suspended in 7 l. of a $10^{-2}$ M phosphate buffer (pH 7.5) containing $3 \times 10^{-2}$ M sodium chloride and $2 \times 10^{-3}$ M ethylenediamine tetraacetic acid (EDTA) and the suspension was subjected to centrifugation after maintaining at a room temperature for 10 minutes with agitation to yield about 7 l. of a supernatant as a crude enzyme solution. The recovery rate of glutaminase GA from the cells was as high as 90% and the specific activity of the crude enzyme solution was 5.4.

The solution was fractionated with ammonium sulfate in the same manner as in Example 1. The precipitated product was dissolved in deionized water, dialysed and lyophilized to yield slightly grayish white powder of glutaminase GA as a crude enzyme product. Thus obtained product had the specific activity of 12.4 and the recovery rate of glutaminase GA from the crude enzyme solution was 82%.

EXAMPLE 3

1.5 kl. of the medium prepared in the same manner as in Example 2 was charged into a tank-fermenter of the capacity of 3.0 kl.: 15 l. of the cultivated solution of *Pseudomonas fluorescens* 30-21 cultivated in the same manner as in Example 1 was inoculated as seed culture thereon and cultivation was carried out under agitation at 35° C. for 10 hours at the rate of 1.2 kl./minute of aeration and at 150 r.p.m. of agitation. The activity of glutaminase GA of thus obtained cultivated solution was 3.0 I.U./ml. and the yield of the cells was 7.5 g./l. as a dry weight.

The cells obtained by centrifugation of the cultivated broth were suspended in 150 l. of a phosphate buffer solution ($10^{-2}$ M, pH 7.5) and the cells were disrupted by a high pressure homogenizer (treated twice under the pressure of 5000 pounds/feet$^3$). The suspension was diluted with 350 l. of deionized water and subjected to centrifugation to remove the cell debris and about 500 l. of a crude enzyme solution of glutaminase GA was obtained. The recovery rate of glutaminase GA from the cells reached 85% and the specific activity of crude enzyme solution was 0.45.

The crude enzyme solution was treated in the same manner as in Example 1 to give an ammonium sulfate fraction. A crude enzyme product of glutaminase GA in a powder form having the specific activity of 8.5 was obtained from the crude enzyme solution in the yield of 80%.

EXAMPLE 4

A crude enzyme product of glutaminase GA obtained in Example 1 (in an amount corresponding to 3,000 units) was dissolved in 100 ml. of a $10^{-2}$ M phosphate buffer solution (pH 7.5) containing 0.01 M of sodium chloride and the solution was adsorbed on a column of TEAE-cellulose previously equilibrated with said buffer solution. Elution was made by means of a linear concentration gradient of sodium chloride in said buffer solution and the eluate was fractionated into 10 ml. portions. The result of elution was shown in FIG. 2. The amount of protein was shown by an absorbance at 280 m$\mu$. Partially purified glutaminase GA obtained from the fractions from No. 17 to 26 was dialysed against deionized water and lyophilized. The specific activity was increased to 40 by this operation. The yield was 65% of the crude enzyme product, and it was 55% of the crude enzyme solution.

The lyophilized sample of glutaminase obtained in the above operation was dissolved in 3 ml. of said buffer solution and the solution was subjected to a gel-filtration through a column (3.0 cm. x 120 cm.) of Bio-gel P-150 equilibrated previously with said buffer solution. Elution was made with the same buffer solution and the eluate was fractionated into 10 ml. portions. The result of said gel-filtration was shown in FIG. 3. Partially purified product of glutaminase GA was obtained from the fractions from No. 21 to 26. The yield from the previous step in this operation was 78%, and that from the crude enzyme solution was 43%, the specific activity being increased to 92.

Partially purified product of glutaminase GA obtained in the above gel-filtration was dialysed against a 0.02 M phosphate buffer solution (pH 6.5) and then adsorbed on a column (2.5 cm. x 60 cm.) of hydroxylapatite (Bio-gel HT) equilibrated previously with said buffer solution. Elution was made by means of a linear concentration gradient of said buffer solution and the eluate was fractionated in 10 ml. portions. The results of elution were shown in FIG. 4. The fraction having the glutaminase activity was obtained from the fractions from No. 58 to 63. The yield in this operation from the previous step was about 88% and that from the crude enzyme solution was 37%, there being almost no increase of the specific activity.

Thus obtained glutaminase GA active fraction was dialysed against deionized water and lyophilized to yield a purified enzyme product of glutaminase GA in a white powder form.

When subjected to electrophoresis according to the conventional disc electrophoretic method, the purified enzyme product was electrophoretically homogeneous.

What is claimed is:

1. A process for producing glutaminase GA, wherein the asparaginase activity is almost equal to the glutaminase activity which comprises cultivating *Pseudomonas fluorescents* ATCC 21541 in a nutrient medium under an aerobic condition until glutaminase GA is substantially accumulated in the culture medium, and recovering the accumulated glutaminase GA therefrom.

2. A process for producing glutaminase GA according to claim 1, wherein the cultivation is carried out at a temperature of from 25 to 37° C.

3. A process for producing glutaminase GA according to claim 1, wherein the initial pH of the nutrient medium is between 6.5 and 7.0.

4. Glutaminase GA wherein the asparaginase activity is almost equal to the glutaminase activity produced from *Pseudomonas fluorescents* ATCC 21541 having the following properties:

(1) the molecular weight is between 96,000 and 105,000 according to a gel-filtration method,
(2) an optimum pH is between 7.0 and 9.0,
(3) it is stable at a pH of from 6 to 8,
(4) 95% of the activity is lost by treating at 50° C. for 10 minutes,
(5) it is strongly inhibited by iodine and pyruvic acid,
(6) it is not influenced by metal ions.

5. A process for producing glutaminase GA according to claim 1, said product having a molecular weight between 96,000 and 105,000 as determined according to a gel-filtration method.

References Cited

Nikolaev et al.: Biokhimiya, 1969, vol. 34, No. 2, pp. 352–355.

Evseev et al.: Biokhimiya, 1968, vol. 33, No. 5, pp. 1106–1110.

Chemical Abstracts 71, 27983a (1969) (Nikolaev et al.).

Chemical Abstracts 70, 9469n (1969) (Evseev et al.).

Ramadan et al.: Archives Biochemistry & Biophysics, 108, 143–157 (1964).

LIONEL M. SHAPIRO, Primary Examiner

U.S. Cl. X.R.

195—66 R, 66 A